United States Patent
Keithley et al.

(10) Patent No.: US 7,155,628 B2
(45) Date of Patent: Dec. 26, 2006

(54) INTEGRATED CIRCUIT AND METHOD FOR DETECTING THE STATE OF AN OSCILLATING SIGNAL

(75) Inventors: Douglas Gene Keithley, Boise, ID (US); Richard David Taylor, Eagle, ID (US); Mark David Montierth, Meridian, ID (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 556 days.

(21) Appl. No.: 10/411,427

(22) Filed: Apr. 10, 2003

(65) Prior Publication Data

US 2004/0205367 A1    Oct. 14, 2004

(51) Int. Cl.
*G06F 1/04* (2006.01)

(52) U.S. Cl. .................. 713/500; 713/502; 714/48
(58) Field of Classification Search ................ 713/500, 713/502; 714/48, 55; 331/64, 74
See application file for complete search history.

(56) References Cited

U.S. PATENT DOCUMENTS

| 5,199,007 | A | 3/1993 | Okano |
| 5,404,356 | A | 4/1995 | Abe |
| 5,440,603 | A | 8/1995 | Sugita |
| 5,828,243 | A * | 10/1998 | Bagley ........................ 327/99 |
| 5,936,452 | A * | 8/1999 | Utsuno et al. .............. 327/292 |
| 6,343,334 | B1 | 1/2002 | Uemura et al. |
| 6,518,848 | B1 * | 2/2003 | Teraishi ...................... 331/74 |
| RE38,154 | E * | 6/2003 | Moroni et al. .............. 365/233 |
| 6,597,204 | B1 * | 7/2003 | Imamura ..................... 327/20 |
| 2001/0045822 | A1 * | 11/2001 | Davidsson et al. ....... 324/76.54 |
| 2004/0158759 | A1 * | 8/2004 | Chang et al. ............... 713/500 |

* cited by examiner

*Primary Examiner*—Lynne H. Browne
*Assistant Examiner*—Paul Yanchus, III

(57) ABSTRACT

Embodiments of the present invention are described in an integrated circuit. The integrated circuit comprises circuit elements configured to be clocked via an oscillating signal, and a detector. The detector is configured to detect a state of the oscillating signal and provide a detection signal indicative of the state of the oscillating signal. The detector comprises a first delay line configured to provide a first delayed signal to logic that provides the detection signal.

19 Claims, 7 Drawing Sheets

INTEGRATED CIRCUIT AND METHOD FOR DETECTING THE STATE OF AN OSCILLATING SIGNAL

THE FIELD OF THE INVENTION

The present invention relates generally to integrated circuits, and more particularly to circuits that monitor oscillating signals.

BACKGROUND OF THE INVENTION

Integrated circuits are designed to operate in electronic systems, which perform larger system functions. Some integrated circuits, referred to as application specific integrated circuits (ASICs), operate in specific applications. An ASIC can be a device including one or more independent functions, a system-on-a-chip or a combination of independent functions and a system-on-a-chip. The system-on-a-chip can include a core processor, memory, and peripheral storage and logic elements.

Integrated circuits typically include circuit elements clocked by oscillating signals to regulate the operation of the system. In an ASIC, an oscillating signal is brought into the device and distributed throughout the circuit. System operation may come to a halt in the event the signal stops oscillating. A system so impaired can leave system components in unsafe and wasteful states, such as driving a motor at maximum current.

Many systems include a watchdog timer (WDT) circuit to reset the system in the event the microprocessor malfunctions or operates uncontrollably. In a conventional WDT circuit, a counter is clocked by an oscillating signal from an initial value toward a predetermined value. The WDT is serviced by a microprocessor to reconfigure the counter to an initial value. The WDT circuit provides a reset signal to the system in the event the counter reaches the predetermined value before being serviced by the microprocessor. With a WDT, the system is reset in the event the microprocessor operates uncontrollably, such as when the code hangs or the microprocessor becomes unstable after an electrostatic discharge (ESD) event. However, the WDT counter needs an oscillating signal to count toward the predetermined value. The counter cannot reach the predetermined value to reset the system after the oscillating signal has stopped.

In one circuit that detects an oscillating signal has stopped, a first timer circuit and a second timer circuit receive the oscillating signal in parallel. One timer circuit detects the oscillating signal has stopped at a high signal level and the other timer circuit detects the oscillating signal has stopped at a low signal level. Each timer circuit includes a capacitor, which is charged and discharged during each cycle of the oscillating signal. After the oscillating signal stops, the capacitor is discharged to a predetermined value and a reset signal is provided.

In another circuit, a one-shot pulse circuit provides a one-shot pulse in response to an oscillating signal. A charge/discharge circuit includes a capacitor, which discharges while the one-shot pulse is high and otherwise charges. A reset signal is generated after the charge voltage on the capacitor exceeds a predetermined value.

The circuit with two timers and the one-shot circuit charge and discharge a capacitor to determine the state of the oscillating signal. The value of the capacitor must be changed to adjust the circuit to oscillating signals of different frequencies. For this reason, the capacitor is usually provided as an external component, which adds cost to the electronic system.

SUMMARY OF THE INVENTION

Embodiments of the present invention are described in an integrated circuit. The integrated circuit comprises circuit elements configured to be clocked via an oscillating signal, and a detector. The detector is configured to detect a state of the oscillating signal and provide a detection signal indicative of the state of the oscillating signal. The detector comprises a first delay line configured to provide a first delayed signal to logic that provides the detection signal.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
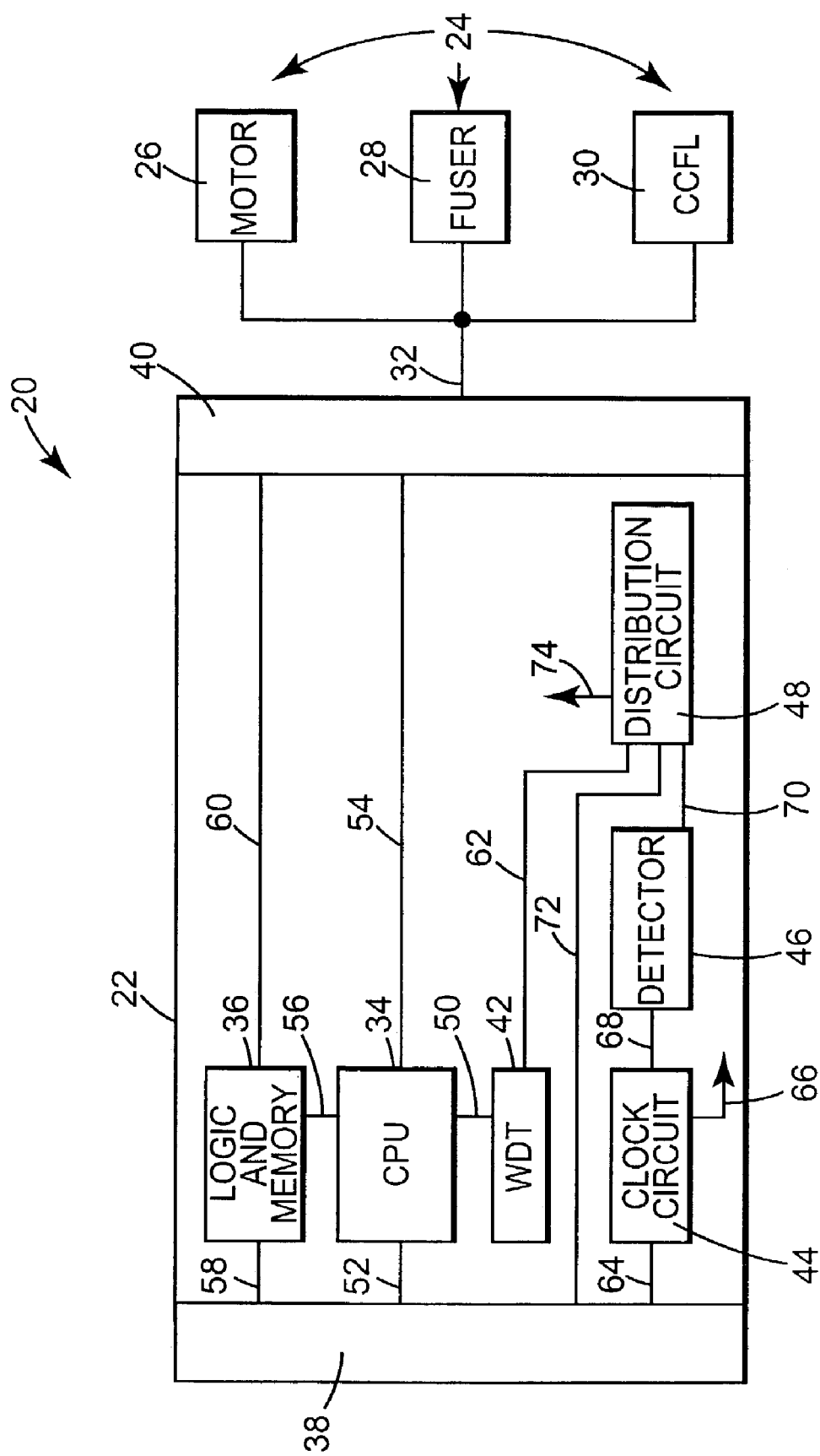
FIG. 1 is a diagram illustrating an exemplary embodiment of an electronic system, according to the present invention.

FIG. 1 is a diagram illustrating an exemplary embodiment of an electronic system 20, according to the present invention. The electronic system 20 includes an integrated circuit 22 and peripheral devices, indicated at 24. In the exemplary embodiment, the electronic system 20 performs document scanning and printing functions. In other embodiments, the electronic system can perform any suitable system functions.

The peripheral devices 24 include a motor 26, a fuser 28 and a cold cathode florescent light (CCFL), indicated at 30. The integrated circuit 22 is electronically coupled to the peripheral devices 24 through peripheral bus 32. Only a limited number and certain types of peripheral devices 24 are shown to simplify the illustration. In practice, any suitable number and type of peripheral device can be included as part of the electronic system.

The integrated circuit 22 controls operation of the peripheral devices 24. The motor 26 provides movement for document scanning and paper moving mechanisms. The fuser 28 provides heat to bind toner to paper, and the CCFL 30 provides light for scanning documents. The integrated circuit 22 controls the motor 26, fuser 28 and CCFL 30 to perform the scanning and printing functions.

In the exemplary embodiment, the integrated circuit 22 monitors an oscillating signal to detect an oscillating state, i.e. the valid clock state, and a stopped state, i.e. the invalid clock state. The oscillating signal is a clock signal used throughout the integrated circuit 22 to clock circuit elements, such as storage elements, in the integrated circuit 22. In the event the oscillating signal stops, the integrated circuit 22 resets a drive circuit to shut down the motor 26 and prevent excessive current draw and overheating. Also, the integrated circuit 22 resets circuit elements to shut down the fuser 28 and prevent overheating, and shut down the CCFL 30 to increase the time between changes of the CCFL 30. These are preventative measures to ensure safe and non-wasteful operation of the peripheral devices 24 after the oscillating signal has stopped.

The integrated circuit 22 includes a central processing unit (CPU) 34, memory and local logic 36, inputs 38, outputs 40, a WDT 42, a clock circuit 44, an oscillating signal detector 46 and a signal distribution circuit 48. The CPU 34 includes circuit elements, such as flip flops, clocked by an oscillating clock signal. The CPU 34 is electrically coupled to the WDT 42 through WDT input conductor 50. The CPU 34 is electrically coupled to inputs 38 through CPU input bus 52, and to outputs 40 through CPU output bus 54. In addition, the CPU 34 is electrically coupled to memory and local logic 36 through memory and logic bus 56.

The memory and local logic 36 includes memory devices, and digital and analog circuits. The memory devices are non-volatile memory, such as ROM, EPROM and EEPROM, and volatile memory, such as RAM. The local logic includes circuit elements clocked by an oscillating signal to perform system functions. The local logic circuit elements include storage elements, such as D flip flops or JK flip flops. The memory and logic bus 56 includes at least one memory bus coupled to the memory devices, and conductors coupled to the digital and analog circuits. The CPU 34 and memory devices communicate through the memory and logic bus 56.

The memory and local logic 36 is electrically coupled to inputs 38 through input logic bus 58, and to outputs 40 through output logic bus 60. The digital and analog circuits in the memory and local logic 36 receive input signals from the CPU 34 through the memory and logic bus 56, and from external sources through the inputs 38 and input logic bus 58. The digital and analog circuits provide output signals to the CPU 34 through memory and logic bus 56 and to the outputs 40 through output logic bus 60.

The WDT 42 is electrically coupled to the CPU 34 through the WDT input conductor 50, and to the signal distribution circuit 48 through a WDT output conductor 62. In addition, the WDT 42 receives a clock signal from the clock circuit 44. WDT 42 includes a counter, which is clocked by the clock signal toward a predetermined value. The WDT 42 receives a service signal from the CPU 34 through the WDT input conductor 50 to reset the counter to an initial value. The WDT 42 resumes counting toward the predetermined value after being reset. The WDT 42 provides a reset signal to the signal distribution circuit 48 in the event the WDT 42 is not serviced by the CPU 34 and the counter reaches the predetermined value. The WDT 42 stops counting in the event the clock signal from the clock circuit 44 stops oscillating.

The clock circuit 44 is electrically coupled to inputs 38 through clock input conductors, indicated at 64. The clock circuit 44 receives an oscillating signal from an outside source, such as a piezoelectric crystal, through the inputs 38 and clock input conductors 64. The clock circuit 44 includes storage elements, which divide down the oscillating signal from the crystal to provide slower oscillating signals. The clock circuit 44 also includes a phase lock loop to provide higher frequency, faster oscillating signals. The oscillating signals are distributed throughout the integrated circuit 22, as indicated at 66. Each distributed clock signal can define a clock domain in the integrated circuit 20. The clock circuit 44 is electrically coupled to the oscillating signal detector 46 through the detector input conductor 68. An oscillating signal from the clock circuit 44 is provided to the oscillating signal detector 46 through the detector input conductor 68.

The oscillating signal detector 46 is electrically coupled to the clock circuit 44 through the detector input conductor 68, and to the signal distribution circuit 48 through a detector output conductor 70. The detector 46 receives an oscillating signal, i.e., a clock signal, through the detector input conductor 68 from the clock circuit 44. The detector 46 monitors the state of the oscillating signal and provides a detection signal indicative of the state of the oscillating signal to the signal distribution circuit 48 through the detector output conductor 70. The detector 46 provides a valid clock signal as the detection signal to indicate the oscillating signal is oscillating, i.e. in the oscillating state. The detector 46 provides an invalid clock signal as the detection signal to indicate the oscillating signal is stopped, i.e., in the stopped state. The valid clock signal can be a high level signal, referred to as a logic "1", and the invalid clock signal can be a low level signal, referred to as a logic "0", or vice-versa.

In one exemplary embodiment, the detector 46 includes two delay lines and detection logic. The oscillating signal is provided to the detection logic and a first delay line. The first delay line provides a first delayed oscillating signal to the detection logic and a second delay line, which provides a second delayed oscillating signal to the detection logic. The detection logic receives at least one low level signal and one high level signal while the oscillating signal is oscillating. The detection logic receives all low level or all high level signals after the oscillating signal has stopped. The delay lines can be fixed or variable delay lines. The detector 46 is part of integrated circuit 22 and does not require external components, such as a capacitor.

In another exemplary embodiment, a detector receives a first and a second oscillating signal. The clock circuit 44 provides the first oscillating signal to the detector through detector input conductor 68, and the second oscillating signal to the detector through a second detector input conductor (not shown). The detector includes storage elements clocked via the first oscillating signal to sample the second oscillating signal. These samples are stored to monitor the state of the second oscillating signal. In another embodiment, a second set of storage elements are clocked via the second oscillating signal to sample a derivative of the first oscillating signal. In this embodiment, the first and second oscillating signals are used to monitor each other. The first and second oscillating signals can be divided down to obtain suitable frequencies for sampling and being sampled. These detectors can be part of integrated circuit 22 and do not require external components, such as a capacitor.

The signal distribution circuit 48 is electrically coupled to the detector 46 through detector output conductor 70, and to WDT 42 through WDT output conductor 62. In addition, the signal distribution circuit 48 is electrically coupled to one of the inputs 38 through reset conductor 72. The signal distribution circuit 48 receives the detection signal through the detector output conductor 70, and the WDT reset signal through the WDT output conductor 62. The signal distribution circuit 48 receives external reset signals, such as those provided by a power-up circuit, through one of the inputs 38 and reset line 72. The signal distribution circuit is configured to provide reset signals, indicated at 74, to the integrated circuit 22.

In the exemplary embodiment, the signal distribution circuit 48 provides a reset signal to resets in multiple clock domains in the integrated circuit 22 in response to a WDT reset signal, an external reset signal and an invalid clock detection signal. In another embodiment, the signal distribution circuit 48 provides a reset signal to resets in multiple clock domains in response to a WDT reset signal, an external reset signal and an invalid clock detection signal. In addition, the invalid clock detection signal is provided to clear pulse width modulation (PWM) output logic driving the motor 26. In another embodiment, the WDT and external reset signals are synchronized with clocks and provided as synchronized reset signals to resets in multiple clock domains. The detection signal bypasses synchronization and is provided as an unsynchronized reset signal to the resets in multiple clock domains. In another embodiment, WDT and external reset signals are synchronized with clock signals and provided as synchronized reset signals to resets in clock domains and to an input/output circuit. The detection signal is provided as an unsynchronized reset signal and only to the input/output circuit.

In operation, the integrated circuit 22 controls the operation of peripheral devices 24 to perform scanning and printing functions. The CPU 34 is programmed to drive the motor 26 and switch the fuser 28 and CCFL 30 on and off as required. The program is stored in the CPU 34 and non-volatile memory in the memory and local logic 36. The CPU 34 pulls operating code from the non-volatile memory. The CPU 34 uses volatile memory in the memory and local logic 36 to temporarily store values and as a scratch pad. The CPU 34 receives input signals, such as keypad inputs, through inputs 38 and via the digital and analog circuits in the memory and local logic 36. The CPU 34 drives the peripheral devices 24 through analog and digital circuits in the memory and local logic 36 and through external circuitry.

While the CPU 34 is controlling operation of the electronic system 20, the WDT 42 monitors operation of the CPU 34. In normal operation, the CPU 34 services the WDT 42 to reset the WDT counter to an initial value. In the event the CPU 34 does not service the WDT 42 before the counter reaches the predetermined value, it is assumed that the CPU 34 is not functioning properly and the WDT 42 provides a WDT reset signal to the signal distribution circuit 48. The WDT reset signal is used to reset the integrated circuit to resume normal operation.

The detector 46 monitors one or more oscillating signals used to clock circuit elements throughout the integrated circuit 22, including the WDT 42. In normal operation, the detector 46 provides a valid clock signal to the signal distribution circuit 48 and operation proceeds as expected. In the event the oscillating signal stops, the detector 46 provides an invalid clock signal to the signal distribution circuit 48, which responds by providing a reset signal to circuit elements of the integrated circuit 22. The reset signal resets circuit elements in the integrated circuit 22 to ensure peripheral devices 24 are not left in an unsafe or wasteful state. In the exemplary embodiment, the motor 26, fuser 28 and CCFL 30 are switched off.

Figure 2:
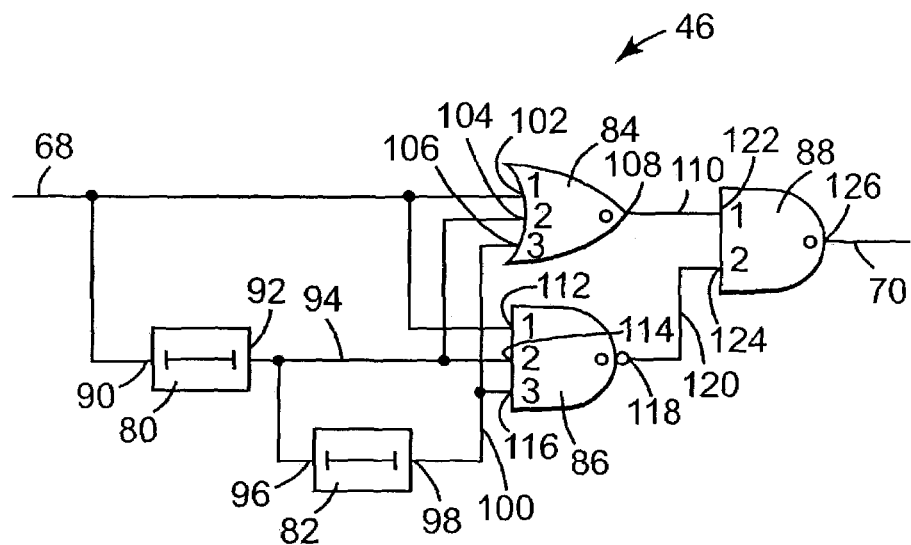
FIG. 2 is a diagram illustrating an exemplary embodiment of an oscillating signal detector.

FIG. 2 is a diagram illustrating an exemplary embodiment of an oscillating signal detector 46. The detector 46 includes a first delay line 80, a second delay line 82, an OR gate 84, a NAND gate 86 and an AND gate 88. The OR gate 84, NAND gate 86 and AND gate 88 are detection logic. The first delay line 80 includes a first delay line input 90 and a first delay line output 92. The first delay line input 90 is electrically coupled to the clock circuit 44, the OR gate 84 and the NAND gate 86 through the detector input conductor 68. The first delay line output 92 is electrically coupled to the second delay line 82, the OR gate 84 and the NAND gate 86 through the first delay line output conductor 94. The second delay line 82 includes a second delay line input 96 and a second delay line output 98. The second delay line input 96 is electrically coupled to the first delay line output 92, the OR gate 84 and the NAND gate 86 through the first delay line output conductor 94. The second delay line output 98 is electrically coupled to the OR gate 84 and the NAND gate 86 through second delay line output conductor 100.

The OR gate 84 is a three input OR gate including a first input, indicated at 102, a second input 104, a third input 106 and an output 108. The OR gate first input 102 is electrically coupled to the clock circuit 44, the first delay line input 90 and NAND gate 86 through the detector input conductor 68. The OR gate second input 104 is electrically coupled to the first delay line output 92, the second delay line input 96 and NAND gate 86 through the first delay line output conductor 94. The OR gate third input 106 is electrically coupled to the second delay line output 98 and NAND gate 86 through the second delay line output conductor 100. The OR gate output 108 is electrically coupled to the AND gate 88 through the OR gate output conductor 110.

The NAND gate is a three input NAND gate including a first input 112, a second input 114, a third input 116 and an output, indicated at 118. The NAND gate first input 112 is electrically coupled to the clock circuit 44, the first delay line input 90 and the OR gate first input 102 through the detector input conductor 68. The NAND gate second input 114 is electrically coupled to the first delay line output 92, the second delay line input 96 and OR gate second input 104 through first delay line output conductor 94. The NAND gate third input 116 is electrically coupled to the second delay line output 98 and the OR gate third input 106 through the second delay line output conductor 100. The NAND gate output 118 is electrically coupled to the AND gate 88 through a NAND gate output conductor 120.

The AND gate 88 is a two input AND gate including a first input 122, a second input 124 and an output 126. The AND gate first input 122 is electrically coupled to OR gate output 108 through the OR gate output conductor 110. The AND gate second input 124 is electrically coupled to the NAND gate output 118 through the NAND gate output conductor 120. The AND gate output 126 is electrically coupled to the signal distribution circuit 48 through the detector output conductor 70.

The detector 46 receives an oscillating signal through the detector input conductor 68 from the clock circuit 44. The oscillating signal is received by the first delay line 80, OR gate 84 and NAND gate 86. The first delay line 80 provides a first delayed oscillating signal to the second delay line 82, OR gate 84 and the NAND gate 86. The second delay line provides a second delayed oscillating signal to the OR gate 84 and the NAND gate 86. The OR gate 84 and NAND gate 86 each receive three signals; the oscillating signal, the first delayed oscillating signal and the second delayed oscillating signal.

In the exemplary embodiment, the first and second delay lines 80 and 82 provide fixed delays. The fixed delays and the oscillating signal frequency are chosen to provide at least one high level and one low level signal to the OR gate 84 and NAND gate 86 while the oscillating signal is oscillating. The OR gate 84 and NAND gate 86 each receive all high level or all low level signals after the oscillating signal has stopped oscillating. In the exemplary embodiment, the first and second fixed delay lines 80 and 82 are configured to provide signal delay values of about ⅓ the period of the provided oscillating signal. In another embodiment, the fixed delay lines 80 and 82 are replaced by variable delay lines.

In the exemplary embodiment, the OR gate 84 and NAND gate 86 provide output signals corresponding to their logic functions in response to the three input signals. While the oscillating signal is oscillating, at least one high level and one low level signal are provided as inputs to the OR gate 84 and the NAND gate 86. The OR gate 84 responds to a high level input with a high level output signal, and the NAND gate 86 responds to a low level input with a high level output signal. The three signals settle to low level signals after the oscillating signal has stopped at a low level, and to high level signals after the oscillating signal has stopped at a high level. The OR gate 84 provides a low level output signal in response to three low level inputs. The NAND gate 86 provides a low level output signal in response to three high level inputs.

The AND gate 88 receives the OR gate and NAND gate output signals and performs a logical AND function on them. While the signal is oscillating, the OR gate and NAND gate signals are high level signals and the AND gate provides a high level output in response to the two high level inputs. This high level output is the valid clock signal. While the oscillating signal is stopped, one of the AND gate inputs 122 and 124 receives a low level signal and the AND gate responds with a low level output signal as the detection signal. The low level detection signal is the invalid clock signal. The detection signal is provided to the signal distribution circuit 48.

In operation, the clock circuit 44 provides the oscillating signal to the detector 46. The detector 46 provides a high level, valid clock signal to the distribution circuit 48 while the oscillating signal is oscillating. The detector 46 provides a low level, invalid clock signal to the distribution circuit 48 after the oscillating signal has stopped.

Figure 3:
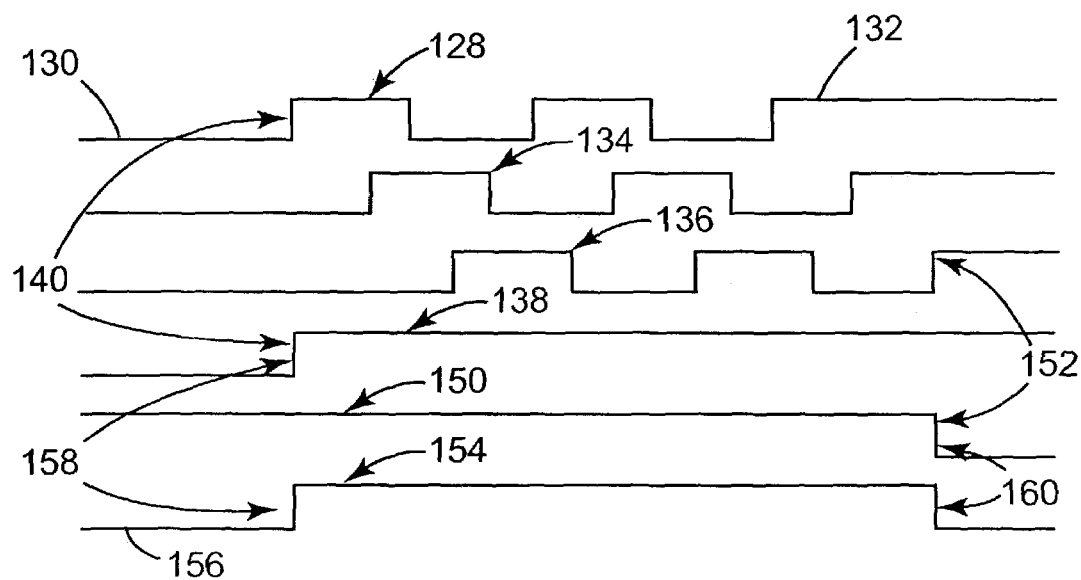
FIG. 3 is a timing diagram illustrating signals in the oscillating signal detector during operation.

FIG. 3 is a timing diagram illustrating signals in the detector 46 during operation. An oscillating signal, indicated at 128 is received by detector 46 from clock circuit 44. In the present example, the oscillating signal 128 starts at a low level, referred to herein as a logic "0" and indicated at 130. The oscillating signal 128 oscillates between the low level and a high level, and stops at the high level, referred to herein as a logic "1" and indicated at 132. The first delayed oscillating signal 134 is similar to oscillating signal 128, except the first delayed oscillating signal 134 is delayed about ⅓ of a period of the oscillating signal 128. The second delayed oscillating signal 136 is similar to the oscillating signal 128 and first delayed oscillating signal 134, except the second delayed oscillating signal 136 is delayed about ⅔ of a period from the oscillating signal 128 and ⅓ of a period from the first delayed oscillating signal 134. The oscillating signal 128 and first delayed oscillating signal 134 include high level portions, which are high at the same time, and low level portions, which are low at the same time. In this aspect, the oscillating signal 128 and first delayed oscillating signal 134 overlap and are overlapping in time. The first and second delayed oscillating signals 134 and 136 include high level portions, which are high at the same time, and low level portions, which are low at the same time. In this aspect, the first and second delayed oscillating signals 134 and 136 overlap and are overlapping in time. The oscillating signal 128, first delayed oscillating signal 134 and second delayed oscillating signal 136 have the same frequency and period while oscillating.

The OR gate output signal 138 starts low and transitions high as the oscillating signal 128 transitions from a low to a high, indicated at 140. The OR gate output signal 138 stays high with at least one of the three input signals 128, 134 and 136 high at all times thereafter.

The NAND gate output signal 150 starts at a high level as the input signals 128, 134 and 136 each start low. The NAND gate output signal 150 remains high as the three signals 128, 134 and 136 oscillate, with at least one signal low at all times. Only after all three input signals 128, 134 and 136 have stopped oscillating and remain high does the NAND gate output signal 150 transition low. As indicated at 152, the NAND gate output signal 150 transitions low as the second delayed oscillating signal transitions high.

The AND gate output signal, referred to as detection signal 154, starts at a low level, indicated at 156. The low level indicates the oscillating signal is an invalid clock signal, i.e., in the stopped state. The detection signal 154 starts low in response to the low OR gate output signal 138. The detection signal 154 transitions high, indicated at 158, as the OR gate output signal 138 transitions high. The high level signal indicates the oscillating signal is a valid clock signal, i.e., in the oscillating state. The detection signal 154 remains high until the NAND gate output signal 150 transitions low. As indicated at 160, the detection signal 154 transitions low as the NAND gate output signal 150 transitions low. The low level indicates the oscillating signal is an invalid clock signal.

Figure 4:
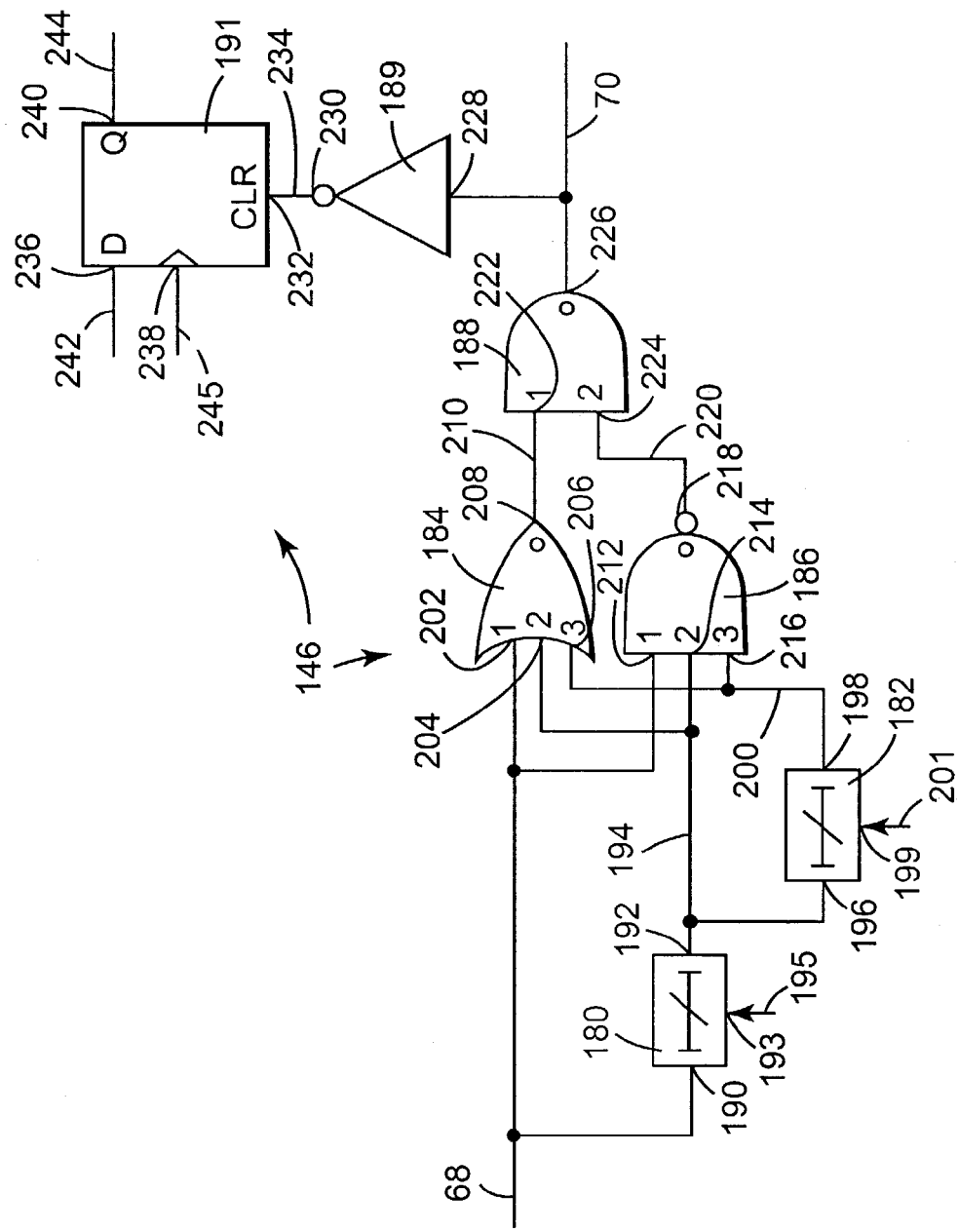
FIG. 4 is a diagram illustrating another exemplary embodiment of an oscillating signal detector.

FIG. 4 is a diagram illustrating another exemplary embodiment of an oscillating signal detector, indicated at 146. The detector 146 includes a first variable delay line 180, a second variable delay line 182, an OR gate 184, a NAND gate 186, an AND gate 188, an inverter 189 and a D flip flop storage element 191. The first delay line 180 has a first delay value and the second delay line 182 has a second delay value, which are adjusted by the CPU 34 to accommodate a range of oscillating signal frequencies. The OR gate 184, NAND gate 186, and AND gate 188 are detection logic. The inverter 189 and storage element 191 are an adjustment circuit for providing feedback to the CPU 34 while the first and second delay values are adjusted.

The first variable delay line 180 includes a first variable delay line input 190, a first variable delay line output 192 and a first variable delay line adjustment input 193. The first variable delay line input 190 is electrically coupled to the clock circuit 44, the OR gate 184 and the NAND gate 186 through the detector input conductor 68. The first variable delay line output 192 is electrically coupled to the second variable delay line 182, the OR gate 184 and the NAND gate 186 through first delay line output conductor 194. The first variable delay line adjustment input 193 is electrically coupled to the CPU 34 through the first variable delay line adjustment bus 195.

The second variable delay line 182 includes a second variable delay line input 196, a second variable delay line output 198 and a second variable delay line adjustment input 199. The second variable delay line input 196 is electrically coupled to the first variable delay line output 192, the OR gate 184 and the NAND gate 186 through the first variable delay line output conductor 194. The second variable delay line output 198 is electrically coupled to the OR gate 184 and the NAND gate 186 through second variable delay line output conductor 200. The second variable delay line adjustment input 199 is electrically coupled to the CPU 34 through the second variable delay line adjustment bus 201.

The OR gate 184 is a three input OR gate including a first input, indicated at 202, a second input 204, a third input 206 and an output 208. The OR gate first input 202 is electrically coupled to the clock circuit 44, the first variable delay line input 190 and the NAND gate 186 through the detector input conductor 68. The OR gate second input 204 is electrically coupled to the first variable delay line output 192, the second variable delay line input 196 and the NAND gate 186 through the first variable delay line output conductor 194. The OR gate third input 206 is electrically coupled to the second variable delay line output 198 and the NAND gate 186 through the second variable delay line output conductor 200. The OR gate output 208 is electrically coupled to the AND gate 188 through the OR gate output conductor 210.

The NAND gate 186 is a three input NAND gate including a first input 212, a second input 214, a third input 216 and an output, indicated at 218. The NAND gate first input 212 is electrically coupled to the clock circuit 44, the first variable delay line input 190 and the OR gate first input 202 through the detector input conductor 68. The NAND gate second input 214 is electrically coupled to the first variable delay line output 192, the second variable delay line input 196 and the OR gate second input 204 through first variable delay line output conductor 194. The NAND gate third input 216 is electrically coupled to the second variable delay line output 198 and the OR gate third input 206 through the second variable delay line output conductor 200. The NAND gate output 218 is electrically coupled to the AND gate 188 through a NAND gate output conductor 220.

The AND gate 188 is a two input AND gate including a first input 222, a second input 224 and an output 226. The AND gate first input 222 is electrically coupled to OR gate output 208 through the OR gate output conductor 210. The AND gate second input 224 is electrically coupled to the NAND gate output 218 through the NAND gate output conductor 220. The AND gate output 226 is electrically coupled to the inverter 189 and the distribution circuit 48 through the detector output conductor 70.

The inverter 189 includes an inverter input 228 and an inverter output 230. The inverter input 228 is electrically coupled to the AND gate output 226 and distribution circuit 48 through the detector output conductor 70. The inverter output 230 is electrically coupled to the clear input 232 of the storage element 191 through the inverter output conductor 234. The inverter 189 inverts the detection signal provided by the detector 146 and AND gate 188.

The storage element 191 is a D flip flop storage element including a data input 236, a clock input 238, clear input 232 and a data output, indicated at 240. The data input 236 and data output 240 are electrically coupled to the CPU 34 through input signal line 242 and output signal line 244, respectively. The clock input 238 is electrically coupled to the clock circuit 44 through clock conductor 245.

Detector 146 receives an oscillating signal through detector input conductor 68 from clock circuit 44. The oscillating signal is received by first variable delay line 180, OR gate 184 and NAND gate 186. The first variable delay line 180 provides a first delayed oscillating signal to second variable delay line 182, OR gate 184 and NAND gate 186. The second variable delay line 182 provides a second delayed oscillating signal to OR gate 184 and NAND gate 186. The OR gate 184 and NAND gate 186 receive three signals; the oscillating signal, the first delayed oscillating signal and the second delayed oscillating signal.

In the exemplary embodiment, the first and second variable delay lines 180 and 182 are adjusted to accommodate a wide range of frequencies. The CPU 34 adjusts the first variable delay line 180 through first variable delay line adjustment bus 195, and second variable delay line 182 through second variable delay line adjustment bus 201. In one configuration, the CPU 34 increments first and second delay values of the first and second variable delay lines 180 and 182 equally to provide first and second delay values, which are essentially equal.

The CPU 34 provides signals to data input 236 of D flip flop storage element 191 and observes signals at data output 240 as it adjusts first and second delay values in the first and second variable delay lines 180 and 182. In one configuration, CPU 34 provides a high signal level to data input 236. Next, CPU 34 increments the first and second delay values of the first and second delay lines 180 and 182. The oscillating signal provided to detector 146 oscillates through a number of cycles and the CPU 34 checks data output 240. This process continues until data output 240 transitions high and stays high for a predetermined number of clock cycles, such as three cycles of the oscillating signal, which indicates the first and second delay values are adjusted to detect the state of the oscillating signal. The first and second delay values can be incremented again to build in a safety margin. The D flip flop storage element 191 is cleared to a low level through inverter 189 in the event the first and second delay values are not properly adjusted to detect the state of the oscillating signal.

The oscillating signal and the adjusted first and second variable delay lines 180 and 182 provide at least one high level and one low level signal to the OR gate 184 and NAND gate 186 while the oscillating signal is oscillating. The OR gate 184 and NAND gate 186 receive all high level or all low level signals after the oscillating signal has stopped oscillating. The OR gate 184 and NAND gate 186 provide output signals corresponding to their logic functions based on the three input signals.

While the oscillating signal is oscillating, at least one high level signal and one low level signal are provided to OR gate 184 and NAND gate 186. The OR gate 184 responds to a high level input with a high level output signal, and NAND gate 186 responds to a low level input with a high level output signal. These two high level output signals are provided to AND gate 188 while the oscillating signal is oscillating.

After the oscillating signal has stopped oscillating, all three signals settle to a low level or a high level. The OR gate 184 provides a low level output signal in response to three low level inputs, and NAND gate 186 provides a low level output signal in response to three high level inputs. The AND gate 188 receives one low level signal after the oscillating signal has stopped oscillating.

The AND gate 188 receives the OR gate 184 and NAND gate 186 output signals and performs a logical AND function on them. While the signal is oscillating, the OR gate 184 and NAND gate 186 provide high level output signals and in response AND gate 188 provides a high level output signal. The high level output signal is the valid clock signal. After the oscillating signal has stopped, AND gate 188 receives one low signal and provides a low level output signal. The low level output signal is the invalid clock signal. The valid and invalid clock signals are provided to the signal distribution circuit 48 and inverter 189. Data output 240 is cleared to a low level in the event an invalid clock signal is provided by AND gate 188.

In operation, the oscillating signal is provided from the clock circuit 44 to the detector 146. The CPU 34 adjusts the first and second variable delay lines 180 and 182 until a high level signal is maintained on the data output 240 of storage element 191. The detector 146 provides a high level detection signal to indicate a valid clock and a low level detection signal to indicate an invalid clock signal. The low level detection signal clears storage element 191. In this situation, the first and second variable delay lines 180 and 182 can be readjusted. The timing diagram for this embodiment is similar to the timing diagram illustrated in FIG. 3.

Figure 5:
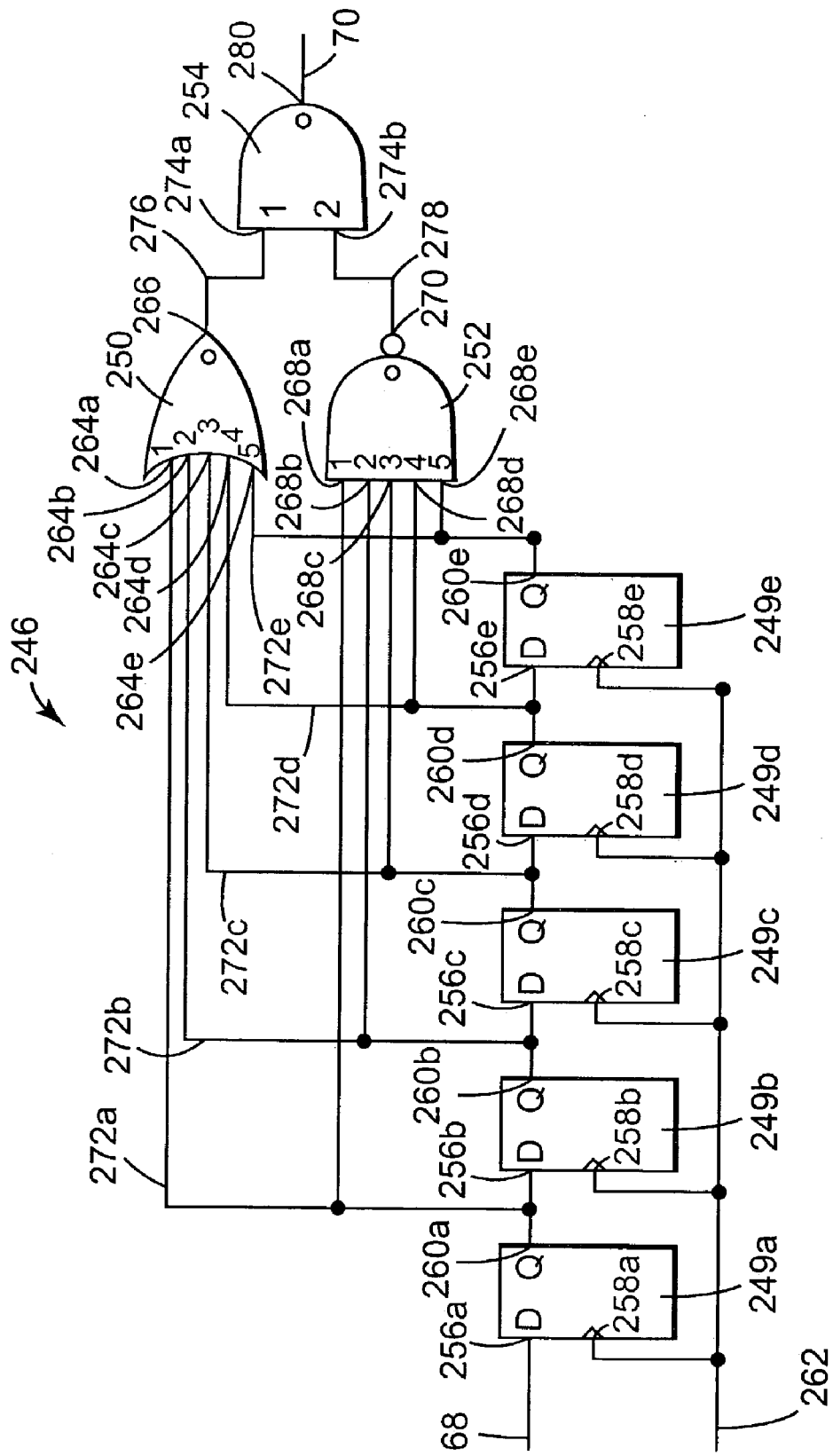
FIG. 5 is a diagram illustrating another exemplary embodiment of an oscillating signal detector.

FIG. 5 is a diagram illustrating another exemplary embodiment of an oscillating signal detector 246. The detector 246 includes storage elements 249a–249e, an OR gate 250, a NAND gate 252 and an AND gate 254. Each storage element 249a–249e includes a data input 256a–256e, a clock input 258a–258e and an output 260a–260e. The clock inputs 258a–258e are electrically coupled to each other and the clock circuit 44 through clock input conductor 262. The data input 256a of storage element 249a is electrically coupled to clock circuit 44 through detector input conductor 68. In this embodiment, the clock circuit 44 is electrically coupled to the detector 246 through two conductors, the detector input conductor 68 (FIG. 1) and the clock input conductor 262.

The OR gate 250 is a five input OR gate and the NAND gate 252 is a five input NAND gate. The OR gate 150 includes a first input 264a, a second input 264b, a third input 264c, a fourth input 264d, a fifth input 264e and an output 266. The NAND gate 252 includes a first input 268a, a second input 268b, a third input 268c, a fourth input 268d, a fifth input 268e and an output 270.

The storage element output 260a is electrically coupled to the storage element data input 256b, the OR gate first input 264a and the NAND gate first input 268a through first output conductor 272a. The storage element output 260b is electrically coupled to the storage element data input 256c, the OR gate second input 264b and the NAND gate second input 268b through second output conductor 272b. The storage element output 260c is electrically coupled to the storage element data input 256d, the OR gate third input 264c and the NAND gate third input 268c through third output conductor 272c. The storage element output 260d is electrically coupled to the storage element data input 256e, the OR gate fourth input 264d and the NAND gate fourth input 268d through fourth output conductor 272d. The storage element output 260e is electrically coupled to the OR gate fifth input 264e and the NAND gate fifth input 268e through fifth output conductor 272e.

The AND gate 254 is a two input AND gate including a first input 274a and a second input 274b. The AND gate first input 274a is electrically coupled to the OR gate output 266 through OR gate output conductor 276. The AND gate second input 274b is electrically coupled to the NAND gate output 270 through NAND gate output conductor 278. The AND gate output 280 is electrically coupled to the signal distribution circuit 48 through detector output conductor 70.

The detector 246 receives a first oscillating signal through the clock input conductor 262 and a second oscillating signal through the detector input conductor 68 from the clock circuit 44. The first oscillating signal clocks the storage elements 249a–249e on a rising edge. In another embodiment, the storage elements 249a–249e can be clocked on a falling edge. The second oscillating signal is received at the data input 256a of storage element 249a.

The first storage element 249a samples the second oscillating signal at the rate of the first oscillating signal to obtain samples of the second oscillating signal. The samples of the second oscillating signal are passed from one storage element 249a–249e to the next as the first oscillating signal clocks the storage elements 249a–249e. In other words, the signal at storage element output 260a is provided at storage element input 256b and clocked to storage element output 260b and so on, with each cycle of the first oscillating signal at clock inputs 258a–258e.

In the exemplary embodiment, up to five samples are stored in storage elements 249a–249e. The number of storage elements and the clock frequencies are chosen to provide at least one low level and one high level signal in storage elements 249a–249e while the second oscillating signal is oscillating. In the event the second oscillating signal stops at a high level, all storage elements 249a–249e eventually store a high level. In the event the second oscillating signal stops at a low level, all storage elements 249a–249e eventually store a low level signal. In other embodiments, any suitable number of storage elements can be used to sample a second oscillating signal at the rate of the first oscillating signal. Five storage elements are shown as an exemplary embodiment. The number needed depends on the relative frequencies of the first and second oscillating signals.

The NAND gate 252 and OR gate 250 receive the five samples stored in storage elements 249a–249e. While the second oscillating signal oscillates, the storage elements 249a–249e store at least one low level and one high level signal. The NAND gate 252 responds to at least one low level signal by providing a high output. The OR gate 250 responds to at least one high level signal by providing a high level output. The OR gate output 266 and the NAND gate output 270 provide high-level inputs to the AND gate 254. The AND gate 254 responds with a high level output to distribution circuit 48, indicating a valid clock.

The NAND gate 252 responds to five high level inputs with a low level output, and the OR gate 250 responds to five low level inputs with a low level output. The storage elements 249a–249e store high level signals after the second oscillating signal has stopped at a high level, and low level signals after the second oscillating signal has stopped at a low level. The AND gate 254 receives one low level input after the second oscillating signal has stopped at a high level or a low level. In response to a low input, the AND gate 254 provides a low level detection signal to distribution circuit 48, indicating an invalid clock.

In operation, first and second oscillating signals are provided to the detector 246 by clock circuit 44. The detector samples one oscillating signal by using the other oscillating signal as a clock signal. The sampling provides at least one low level and one high level signal to indicate the monitored signal is oscillating. The sampling provides all low level or all high level signals after the sampled signal has stopped. The AND gate 254 provides valid and invalid clock signals to distribution circuit 48. In the exemplary embodiment, sampling is accomplished using D flip flops in series. In other embodiments, sampling can be accomplished with other suitable circuits.

Figure 6:
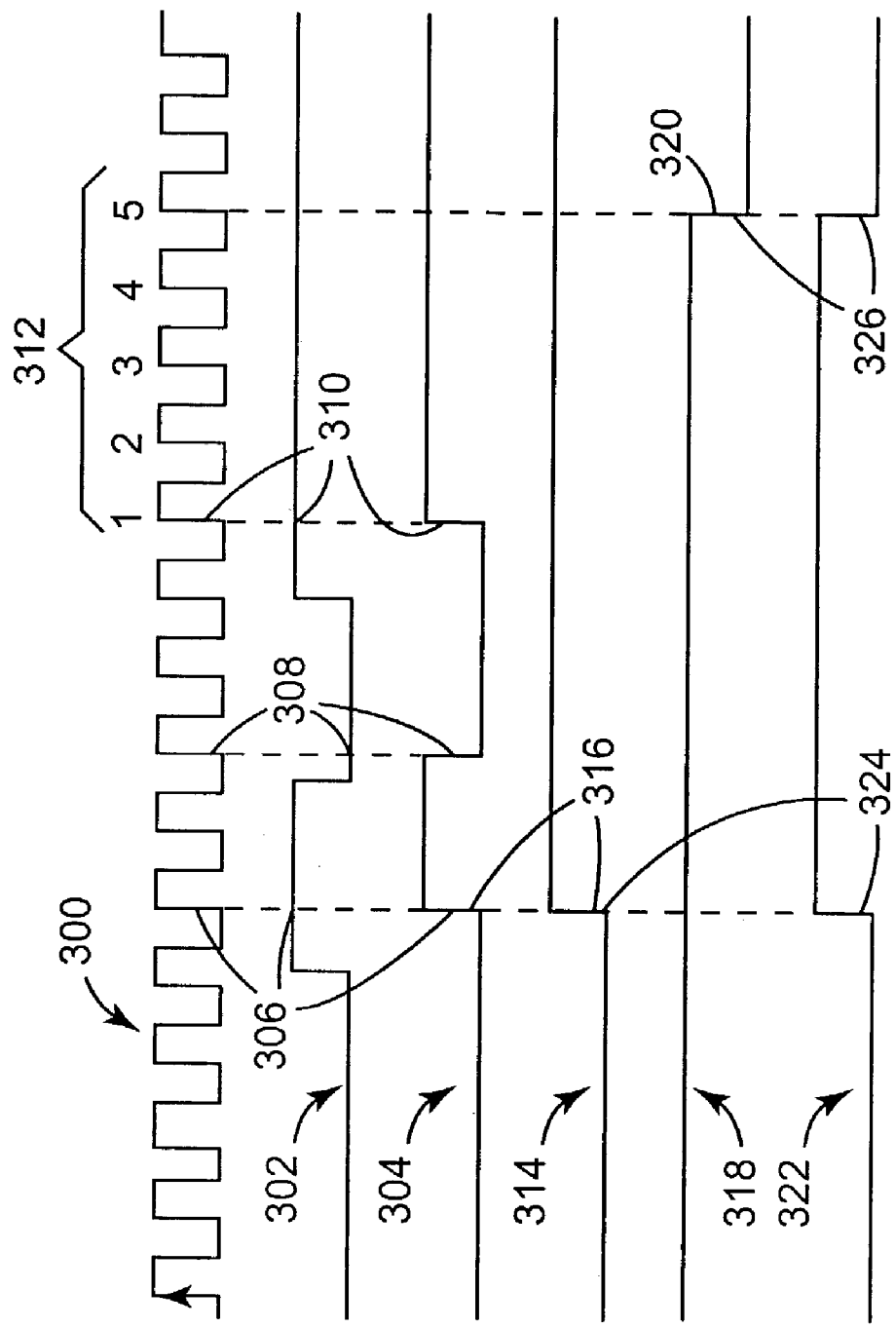
FIG. 6 is a timing diagram illustrating signals in the oscillating signal detector during operation.

FIG. 6 is a timing diagram illustrating signals in the oscillating signal detector 246 during operation. The first oscillating signal, indicated at 300, is received by detector 246 through clock input conductor 262 from clock circuit 44. The first oscillating signal 300 clocks the storage elements 249a–249e. The second oscillating signal, indicated at 302, is received by detector 246 through detector input conductor 68 from clock circuit 44. The second oscillating signal 302 is provided as data input to first storage element 249a.

In the exemplary embodiment, the first oscillating signal 300 is oscillating about 5 times faster than the second oscillating signal 302. Also, five storage elements 249a–249e are used to store samples of the second oscillating signal 302. The relative frequencies of the first and second oscillating signals 300 and 302, and the number of storage elements are chosen to provide samples from one cycle including at least one high level and one low level value, while the second oscillating signal 302 oscillates. The samples are all high level signals or all low level signals while the second oscillating signal 302 is stopped or not oscillating.

The first storage element 249a provides an output signal, indicated at 304. The first storage element 249a is clocked by the first oscillating signal 300 to sample the second oscillating signal 302. The storage elements 249a–249e are clocked by the rising edge of the first oscillating signal 300. In other embodiments, the storage elements 249a–249e can be clocked by the falling edge of the first oscillating signal 300. As indicated at 306, the first storage element 249a transitions from a low level to a high level as it samples a high from the second oscillating signal 302. Samples from the first storage element 249a are passed to the next storage element 249b and so on, at each rising edge of the first oscillating signal 300. As indicated at 308, the first storage element 249a transitions from a high level to a low level as it samples a low level signal from the second oscillating signal 302. The first storage element 249a transitions from a low level to a high level, indicated at 310, as it samples a high level signal from the second oscillating signal 302. The first storage element output signal 304 remains high for the remaining time, including during samples 1–5, indicated at 312.

The OR gate 250 provides an OR gate output signal, indicated at 314. The OR gate output signal 314 begins in a low state, as the second oscillating signal 302 begins in the low state and, in the present example, the second oscillating signal 302 has been low for a sufficient length of time to provide all low samples to storage elements 249a–249e. The OR gate output signal 314 transitions from a low level to a high level as the first storage element output signal 304 transitions from a low level to a high level, indicated at 316. At least one storage element 249a–249e stores a high level for the remaining time and in response OR gate output signal 314 remains high for the remaining time.

The NAND gate 252 provides a NAND gate output signal, indicated at 318. The NAND gate output signal 318 begins in the high state and remains in the high state as long as at least one low level signal is stored in storage elements 249a–249e. The first storage element 249a transitions from a low level to a high level at 310 and remains high as it stores samples 1–5, indicated at 312. All five storage elements 249a–249e store high values as the fifth high sample is taken by the first storage element 249a. The NAND gate 252 transitions from a high level to a low level, indicated at 320, in response to five high level inputs.

The AND gate 254 provides the detection signal, indicated at 322. The AND gate 254 receives the OR gate output signal 314 and the NAND gate output signal 318 as inputs. The detection signal 322 transitions from a low level to a high level, indicated at 324, in response to the OR gate output signal 314 transitioning from a low level to a high level. The detection signal 322 indicates a valid clock with the high level signal. The detection signal 322 transitions from a high level to a low level, indicated at 326, in response to the NAND gate output signal 318 transitioning from a high level to a low level. The detection signal 322 indicates an invalid clock with the low level signal.

In another exemplary embodiment, the oscillating signal monitor includes two detectors, such as detector 246, and an oscillating signal divider circuit. The monitor includes a first detector and a second detector. The first detector receives a first oscillating signal as a clock signal, which is used to sample a second oscillating signal. The second detector receives the second oscillating signal as a clock signal to sample a third oscillating signal. The third oscillating signal is a derivative of the first oscillating signal. The first oscillating signal is provided to the divider circuit, which divides the first oscillating signal down to obtain the third oscillating signal. In this configuration, the first oscillating signal via the third oscillating signal, and the second oscillating signal are monitored. In the exemplary embodiment, the first and second detectors are each similar to detector 246, previously described in this specification. In other embodiments, any suitable detectors can be used.

The divider circuit is any divider circuit. In one embodiment, the divider circuit is one or more toggle flip flops electrically coupled in series. The first toggle flip flop receives an oscillating signal as a clock input. The output of the first toggle flip flop toggles between low level and high level values on each rising edge, or in the alternative, on each falling edge of the oscillating signal at the clock input. This divides the oscillating signal by two and provides an output signal, which is one half the frequency of the clock signal. The output of the first toggle flip flop is electrically coupled to the clock input of a next flip flop in series to divide the oscillating signal down further.

The first detector receives the first oscillating signal and the second oscillating signal from the clock circuit 44. The first oscillating signal is provided as the clock input to the first detector and to the divider circuit. The second oscillating signal is provided as the data input to the first storage element in the first detector. The relative frequencies of the first and second oscillating signals and the number of storage elements in the first detector are chosen to operate as in detector 246. The divider circuit receives the first oscillating signal as a clock input and divides it down to provide a third oscillating signal.

The second detector receives the second oscillating signal from the clock circuit 44 and the third oscillating signal from the divider circuit. The second oscillating signal is provided as the clock input to the second detector. The third oscillating signal is provided as the data input to the first storage element of the second detector. The relative frequencies of the second and third oscillating signal, and the number of storage elements in the second detector are chosen to operate as in detector 246.

The first detector and the second detector are electrically coupled to the signal distribution circuit 48. The first detector provides a first detection signal to the distribution circuit 48 indicating valid and invalid clock signals in regard to the second oscillating signal. The second detector provides a second detection signal to the distribution circuit 48 indicating valid and invalid clock signals in regard to the third, and indirectly first oscillating signal. The signal distribution circuit 48 provides reset signals to predetermined elements in the integrated circuit 22 in response to invalid clock signals from the first and second detectors.

Figure 7:
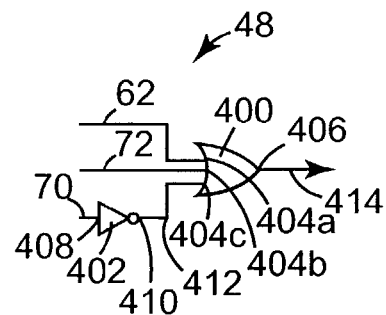
FIG. 7 is a diagram illustrating an exemplary embodiment of a signal distribution circuit.

FIG. 7 is a diagram illustrating an exemplary embodiment of the signal distribution circuit 48. The signal distribution circuit 48 includes a distribution circuit OR gate 400 and an inverter 402. The OR gate 400 includes three inputs 404a–404c and an OR gate output 406. The inverter 402 includes an input 408 and an output 410.

The OR gate 400 is electrically coupled to the WDT 42, one of the external inputs 38 and the inverter 402. OR gate input 404a is electrically coupled to the WDT 42 through WDT output conductor 62. OR gate input 404b is electrically coupled to one of the external inputs 38 through reset conductor 72, and the third OR gate input 404c is electrically coupled to the inverter output 410 through inverter output conductor 412. The inverter input 408 is electrically coupled to the detector 46 through detector output conductor 70. The OR gate output 406 is electrically coupled to resets, indicated at 414. The resets are on circuit elements in any clock domain within integrated circuit 22.

In operation, signal distribution circuit 48 responds to reset signals and detection signals by providing resets to circuit elements throughout integrated circuit 22. The WDT 42 provides a reset signal to signal distribution circuit 48 in response to not being properly serviced by the CPU 34. In this situation, the CPU 34 is reset as it is assumed the CPU 34 is not functioning properly. External reset signals are provided to integrated circuit 22 through one of the external inputs 38 and signal distribution circuit 48. External resets can come from external elements, such as a tester or power supply circuit. The detection signal is a clock valid or clock invalid signal provided by detector 46 to signal distribution circuit 48. The detector 46 resets integrated circuit 22 in response to the oscillating signal not oscillating.

In the exemplary embodiment, the WDT 42 and one of the external inputs 38 provide a high level signal and the detector 46 provides a low level signal to reset the integrated circuit 22. In other embodiments, different signal levels can be used to provide resets and detection signals with the logic of distribution circuit 48 adjusted accordingly.

Figure 8:
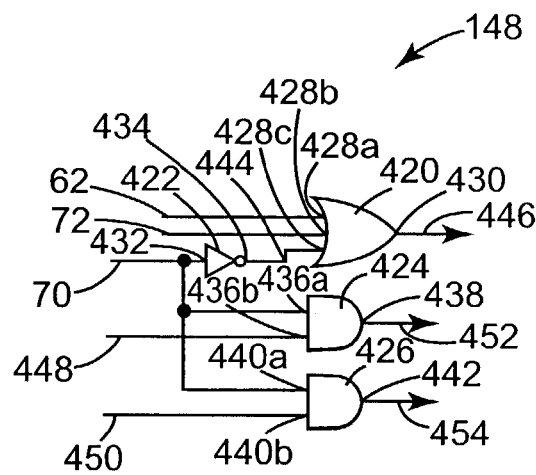
FIG. 8 is a diagram illustrating another exemplary embodiment of a signal distribution circuit.

FIG. 8 is another exemplary embodiment of a signal distribution circuit 148. The signal distribution circuit 148 includes an OR gate 420, an inverter 422, a first AND gate 424 and a second AND gate 426. The OR gate 420 includes three OR gate inputs 428a–428c and an output 430. The inverter 422 includes an input 432 and an output 434. The first AND gate 424 includes two inputs 436a–436b and a first AND gate output 438, and the second AND gate 426 includes two inputs 440a–440b and a second AND gate output 442.

The OR gate 420 is electrically coupled to the WDT 42, one of the external inputs 38 and the inverter 422. OR gate input 428a is electrically coupled to the WDT 42 thorough WDT output conductor 62. OR gate input 428b is electrically coupled to one of the external inputs 38 through reset conductor 72, and the third OR gate input 428c is electrically coupled to the inverter output 434 through inverter output conductor 444. The inverter input 432 is electrically coupled to the detector 46, first AND gate 424 and second AND gate 426 through detector output conductor 70. The OR gate output 430 is electrically coupled to resets, indicated at 446. The resets are on circuit elements in any clock domain within integrated circuit 22.

The first and second AND gates 424 and 426 are electrically coupled to pulse width modulator (PWM) outputs and detector 46. A PWM, which is part of integrated circuit 22 includes the PWM outputs to drive the motor 26. One of the first AND gate inputs 436b is electrically coupled to one PWM output through a first PWM conductor 448. One of the second AND gate inputs 440b is electrically coupled to a second PWM output through a second PWM conductor 450. The other first AND gate input 436a and the other second AND gate input 440a are electrically coupled to each other, the inverter input 432 and detector 46 through detector output conductor 70. The first AND gate output 438 is electrically coupled to one of the external outputs 40 through first AND gate output conductor 452, and the second AND gate output 442 is electrically coupled to another one of the external outputs 40 through second AND gate output conductor 454.

In operation, distribution circuit 148 responds to reset signals and detection signals by providing resets to circuit elements throughout integrated circuit 22. In addition, distribution circuit 148 disables PWM outputs to shut off the motor 26 through AND gates 424 and 426 in response to an invalid clock signal from detector 46. The WDT 42 provides a reset signal to distribution circuit 148 in response to not being properly serviced by the CPU 34. In this situation, the CPU 34 is reset as it is assumed the CPU 34 is not functioning properly. External resets are provided through external inputs 38 to distribution circuit 148. External resets can come from external elements, such as a tester or power supply circuit. In a third situation, detector 46 provides the detection signal to distribution circuit 148. The detection signal indicates a valid clock or an invalid clock. The distribution circuit 148 resets circuit elements in integrated circuit 22 and disables PWM outputs through AND gates 424 and 426 in response to receiving a low level detection signal, i.e., an invalid clock signal. The low level detection signal sets the AND gate outputs 438 and 442 low and is inverted to a high level by inverter 422.

High level signals from the WDT 42, one of the external inputs 38 and the inverter 422 set the OR gate output 430 high to reset circuit elements in integrated circuit 22. The signal from the OR gate output 430 resets circuit elements in multiple clock domains throughout integrated circuit 22. In other embodiments, different logic levels can be used to reset circuit elements in integrated circuit 22, with the logic in distribution circuit 148 adjusted accordingly.

Figure 9:
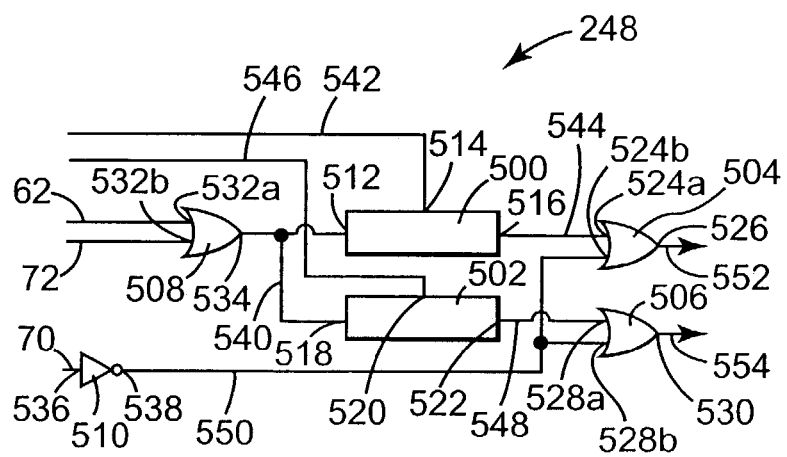
FIG. 9 is a diagram illustrating another exemplary embodiment of a signal distribution circuit.

FIG. 9 is a diagram illustrating another exemplary embodiment of a signal distribution circuit 248. The signal distribution circuit 248 includes a clock A synchronization circuit 500, a clock B synchronization circuit 502, a first OR gate 504, a second OR gate 506, a third OR gate 508 and an inverter 510. The clock A synchronization circuit 500 includes a data input 512, a clock input 514 and a data output 516. The clock B synchronization circuit 502 includes a data input 518, a clock input 520 and a data output 522. The first OR gate 504 includes two inputs 524a–524b and a first OR gate output 526. The second OR gate 506 includes two inputs 528a–528b and a second OR gate output 530. The third OR gate 508 includes two inputs 532a–532b and a third OR gate output 534. The inverter 510 includes an inverter input 536 and an inverter output 538.

The clock A synchronization circuit 500 is electrically coupled to the clock B synchronization circuit 502, the third OR gate 508, the first OR gate 504 and the clock circuit 44. The clock A synchronization circuit date input 512 is electrically coupled to the clock B synchronization circuit data input 518 and the third OR gate output 534 through third OR gate output conductor 540. The clock A synchronization circuit clock input 514 is electrically coupled to the clock circuit 44 through the clock A input conductor 542. The clock A synchronization circuit data output 516 is electrically coupled to one of the first OR gate inputs 524a through clock A data output conductor 544.

The clock B synchronization circuit 502 is electrically coupled to the clock A synchronization circuit 500, third OR gate 508, second OR gate 506 and the clock circuit 44. The clock B synchronization circuit data input 518 is electrically coupled to the clock A synchronization circuit data input 512 and the third OR gate output 534 through third OR gate output conductor 540. The clock B synchronization circuit clock input 520 is electrically coupled to the clock circuit 44 through clock B input conductor 546. The clock B synchronization circuit data output 522 is electrically coupled to one of the second OR gate inputs 528a through clock B data output conductor 548.

The third OR gate 508 is electrically coupled to the WDT 42, one of the external inputs 38, the clock A synchronization circuit 500 and the clock B synchronization circuit 502. One of the third OR gate inputs 532a is electrically coupled to the WDT 42 through WDT output conductor 62. The other third OR gate input 532b is electrically coupled to one of the external inputs 38 through reset input conductor 72. The third OR gate output 534 is electrically coupled to the clock A and clock B synchronization circuit data inputs 512 and 518 through third OR gate output conductor 540.

The first OR gate 504 is electrically coupled to clock A synchronization circuit 500, second OR gate 506, inverter 510 and resets in one or more clock domains of integrated circuit 22. One of the first OR gate inputs 524a is electrically coupled to clock A synchronization circuit output 516 through clock A data output conductor 544. The other first OR gate input 524b is electrically coupled to one of the second OR gate inputs 528b and the inverter output 538 through inverter output conductor 550. The first OR gate output 526 is electrically coupled to resets throughout the integrated circuit 22, indicated at 552.

The second OR gate 506 is electrically coupled to clock B synchronization circuit 502, the first OR gate 504, inverter 510, and resets in one or more clock domains of integrated circuit 22. One of the second OR gate inputs 528a is electrically coupled to clock B synchronization circuit output 522 through clock B data output conductor 548. The other second OR gate input 528b is electrically coupled to inverter output 538 and first OR gate input 524b through inverter output conductor 550. The second OR gate output 530 is electrically coupled to resets throughout integrated circuit 22, indicated at 554.

The inverter 510 is electrically coupled to the detector 46, the first OR gate 504 and the second OR gate 506. The inverter input 536 is electrically coupled to the detector 46 through detector output conductor 70. The inverter output 538 is electrically coupled to first and second OR gates 504 and 506 through inverter output conductor 550.

The clock A synchronization circuit 500 synchronizes reset signals received at data input 512 to a clock A signal received at clock input 514. The clock A synchronization circuit 500 provides a clock A synchronized reset signal at data output 516. The clock B synchronization circuit 502 synchronizes a reset signal received at data input 518 to a clock B signal received at clock input 520. The clock B synchronization circuit 502 provides a clock B synchronized reset signal at data output 522. In the exemplary embodiment, the clock A and clock B synchronization circuits 500 and 502 are each D flip flop storage elements with data inputs 512 and 518 electrically coupled to the data input of a flip-flop. The clock inputs 514 and 520 are electrically coupled to the clock input of the flip flop. The D flip flop output provides synchronized reset signals. In other embodiments, different suitable synchronization circuits can be used.

In operation, the signal distribution circuit 248 receives reset signals and detection signals to reset circuit elements in integrated circuit 22. The reset signals are provided by the WDT 42 and external elements. These reset signals are synchronized to clock A and clock B, which are provided by clock circuit 44. The detection signals are provided by detector 46. The detection signals bypass the synchronization circuits 500 and 502 and are provided by the distribution circuit 248 as unsynchronized reset signals throughout integrated circuit 22.

Clock A and clock B signals are provided to the clock A and clock B synchronization circuits 500 and 502 by the clock circuit 44. In one situation, the WDT 42 provides a reset signal to the third OR gate 508. In another situation, a reset signal is provided through one of the external inputs 38 to the third OR gate 508. The third OR gate provides a reset signal to the clock A and clock B synchronization circuit inputs 512 and 518. The clock A and clock B synchronization circuits 500 and 502 synchronize the reset signals to clock A and clock B provided by the clock circuit 44. A synchronized clock A reset is provided to the first OR gate 504 and a synchronized clock B reset is provided to the second OR gate 506. In response, the first and second OR gates 504 and 506 provide clock A and clock B synchronized resets throughout integrated circuit 22.

In another situation, the detector 46 provides a low, invalid clock signal to inverter 510. The inverter 510 inverts the low signal to a high signal, which is received by the first and second OR gates 504 and 506. The first and second OR gates 504 and 506 provide unsynchronized reset signals throughout integrated circuit 22. The invalid clock signal indicates an oscillating signal has stopped oscillating. Synchronized resets cannot be provided after clock signals have stopped oscillating. Unsynchronized resets ensure safe and non-wasteful operation of the electronic system 20.

Figure 10:
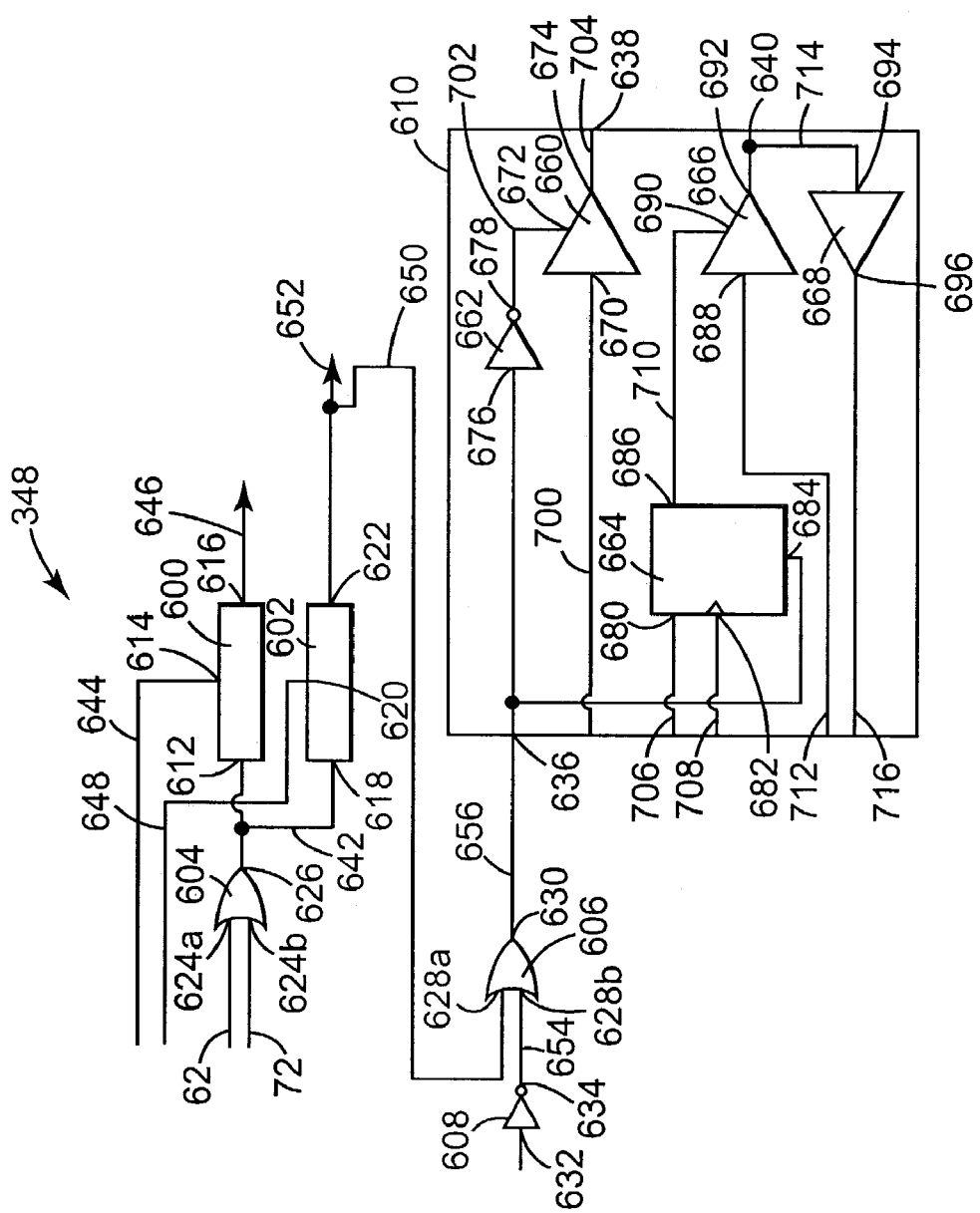
FIG. 10 is a diagram illustrating another exemplary embodiment of a signal distribution circuit.

FIG. 10 is a diagram illustrating another exemplary embodiment of a signal distribution circuit 348. The signal distribution circuit 348 includes a clock A synchronization circuit 600, a clock B synchronization circuit 602, a first OR gate 604, a second OR gate 606 an inverter 608 and an input/output circuit 610. The clock A synchronization circuit 600 includes a data input 612, a clock input 614 and a data output 616. The clock B synchronization circuit 602 includes a data input 618, a clock input 620 and a data output 622. The first OR gate includes two inputs 624a–624b and a first OR gate output 626. The second OR gate 606 includes two inputs 628a–628b and a second OR gate output 630. The inverter 608 includes an inverter input 632 and an inverter output 634. The input/output circuit 610 includes a reset input 636, an output buffer output 638 and an input/output buffer output 640.

The clock A synchronization circuit 600 is electrically coupled to the clock B synchronization circuit 602, the first OR gate 604 and the clock circuit 44. The clock A synchronization circuit data input 612 is electrically coupled to the clock B synchronization circuit data input 618 and the first OR gate output 626 through first OR gate output conductor 642. The clock A synchronization circuit clock input 614 is electrically coupled to the clock circuit 44 through clock A input conductor 644. The clock A synchronization circuit data output 616 is electrically coupled to resets, indicated at 646, in multiple clock domains of integrated circuit 22.

The clock B synchronization circuit 602 is electrically coupled to the clock A synchronization circuit 600, first OR gate 604, the clock circuit 44 and the second OR gate 606. The clock B synchronization circuit data input 618 is electrically coupled to the clock A synchronization circuit data input 612 and the first OR gate output 626 through first OR gate output conductor 642. The clock B synchronization circuit clock input 620 is electrically coupled to the clock circuit 44 through clock B input conductor 648. The clock B synchronization circuit data output 622 is electrically coupled to one of the second OR gate inputs 628a through clock B data output conductor 650 and to resets, indicated at 652, in selected clock domains of integrated circuit 22.

The first OR gate 604 is electrically coupled to the WDT 42, one of the external inputs 38, the clock A synchronization circuit 600 and the clock B synchronization circuit 602. One of the first OR gate inputs 624a is electrically coupled to WDT 42 through WDT output conductor 62, and the other first OR gate input 624b is electrically coupled to one of the external inputs 38 through reset input conductor 72. The first OR gate output 626 is electrically coupled to clock A and clock B synchronization circuit data inputs 612 and 618 through first OR gate output conductor 642.

The second OR gate 606 is electrically coupled to clock B synchronization circuit 602, the inverter 608 and the input/output circuit 610. One second OR gate input 628a is electrically coupled to the clock B synchronization circuit data output 622 through clock B data output conductor 650. The other second OR gate input 628b is electrically coupled to inverter output 634 through inverter output conductor 654. The second OR gate output 630 is electrically coupled to the reset input 636 through second OR gate output conductor 656.

The input/output circuit 610 includes a first output buffer 660, an inverter 662, a storage element 664, a second output buffer 666 and an input buffer 668. The first output buffer 660 includes a first output buffer input 670, a first enable input 672 and a first output buffer output 674. The inverter 662 includes an inverter input 676 and an inverter output 678. The storage element 664 includes a data input 680, a clock input 682, a clear input 684 and a data output 686. The second output buffer 666 includes a second output buffer input 688, a second enable input 690 and a second output buffer output 692. The input buffer 668 includes an input buffer input 694 and an input buffer output 696.

The first output buffer 660 is electrically coupled to the inverter 662, circuit elements in integrated circuit 22 and output 638. The first output buffer input 670 is electrically coupled to circuit elements in integrated circuit 22 through first output buffer input conductor 700. The first enable input 672 is electrically coupled to the inverter output 678 through inverter output conductor 702. The first output buffer output 674 is electrically coupled to output 638 through first output buffer output conductor 704.

The inverter 662 is electrically coupled to the second OR gate 606, the storage element 664 and the first output buffer 660. The inverter input 676 is electrically coupled to the second OR gate output 630 and the storage element clear input 684 through the second OR gate output conductor 656. The inverter output 678 is electrically coupled to the first enable input 672 through inverter output conductor 702.

Storage element 664 is electrically coupled to circuit elements in the integrated circuit 22, the clock circuit 44, the second OR gate 606, the inverter 662 and the second output buffer 666. The storage element data input 680 is electrically coupled to circuit elements in the integrated circuit 22 through data input conductor 706. The clock input 682 is electrically coupled to the clock circuit 44 through input/output clock conductor 708. The storage element clear input 684 is electrically coupled to the inverter input 676 and the second OR gate output 630 through second OR gate output conductor 656. The storage element data output 686 is electrically coupled to the second enable input 690 through data output conductor 710.

The second output buffer 666 is electrically coupled to circuit elements in integrated circuit 22, the storage element 664, input/output buffer output 640, and the input buffer 668. The second output buffer input 688 is electrically coupled to circuit elements in integrated circuit 22 through second output buffer input conductor 712. The second enable input 690 is electrically coupled to data output 686 through data output conductor 710. The second output buffer output 692 is electrically coupled to input/output buffer output 640 and the input buffer input 694 through second output buffer output conductor 714.

The input buffer 668 is electrically coupled to input/output buffer output 640, the second output buffer 666 and circuit elements in integrated circuit 22. The input buffer input 694 is electrically coupled to the second output buffer output 692 and the input/output buffer output 640 through second output buffer output conductor 714. The input buffer output 696 is electrically coupled to internal circuit elements in integrated circuit 22 through input buffer output conductor 716.

The clock A and clock B synchronization circuits 600 and 602 synchronize reset signals to clock A and clock B signals, as previously described. The clock A synchronization circuit 600 synchronizes a reset signal received at data input 612 to a clock A signal received at clock input 614. The clock A synchronization circuit 600 provides a clock A synchronized reset signal at data output 616. The clock B synchronization circuit 602 synchronizes a reset signal received at data input 618 to a clock B signal received at clock input 620. The clock B synchronization circuit 602 provides a clock B synchronized reset signal at data output 622. The clock A and clock B signals are provided by clock circuit 44. In the exemplary embodiment, the clock A and clock B synchronization circuits 600 and 602 are each D flip flop storage elements with data inputs 612 and 618 electrically coupled to a data input of a flip-flop. The clock inputs 614 and 620 are electrically coupled to the clock input of the flip flop. The D flip flop output provides synchronized reset signals. In other embodiments, different suitable synchronization circuits can be used.

The input/output circuit 610 receives a reset signal at reset input 636 and disables first and second output buffers 660 and 666. In normal operation, the first output buffer 660 is enabled to transfer data from inside integrated circuit 22 to outside integrated circuit 22. The second output buffer 666 is enabled by setting the storage element output 686 high. Signals from inside integrated circuit 22 are transferred to outside integrated circuit 22 through an enabled second output buffer 666. External signals or signals from the second output buffer 666 are transferred to inside integrated circuit 22 by input buffer 668.

In operation, the signal distribution circuit 348 receives reset signals and detection signals. The reset signals are synchronized to clock A and clock B signals provided by clock circuit 44. The clock A and Clock B synchronized reset signals are provided to resets in multiple clock domains throughout the integrated circuit 22. The clock B synchronized reset signal is also provided to the input/output circuit 610 through second OR gate 606.

In one situation, the WDT 42 provides a reset signal to the first OR gate 604. In a second situation, an external reset signal is provided to first OR gate 604 through external inputs 38. In each of these situations, the OR gate 604 provides a reset signal to clock A and clock B synchronization circuits 600 and 602, which provide resets throughout integrated circuit 22. In addition, the clock B synchronization circuit 602 provides a reset signal to the second OR gate 606. The second OR gate 606 provides a reset signal to the input/output circuit 610 to disable first and second output buffers 660 and 666. The first output buffer 660 is disabled through inverter 662, and the second output buffer 666 is disabled through clearing storage element 664.

In a third situation, the detector 46 provides a low, invalid clock signal to inverter 608. The inverter 608 inverts the low signal to a high signal and second OR gate 606 provides the high signal as a reset signal to the input/output circuit 610. The input/output circuit 610 is an example of using the detection signal to disable particular outputs. The input/output circuit 610 disables the first output buffer 660 through inverter 662 and the second output buffer 666 through storage element clear input 684 of storage element 664. The invalid clock signal bypasses the clock A and clock B synchronization circuits 600 and 602 to disable output buffers 660 and 666. Unsynchronized disabling of output buffers 660 and 666 ensures safe and non-wasteful operation of the electronic system 20.

The electronic system 20 and integrated circuit 22 include a detector and signal distribution circuit configured to monitor oscillating signals and distribute reset signals, including detection signals. The detector detects an oscillating signal state, which is an oscillating state or a stopped state. The detector provides an invalid clock signal to the distribution circuit in response to detecting the oscillating signal has stopped. The distribution circuit resets circuit elements in integrated circuit 22 in response to receiving the invalid clock signal. Resetting circuit elements includes resetting internal circuit elements and disabling output buffers to ensure safe and non-wasteful operation.

The detectors can be implemented completely inside integrated circuit 22 with readily available components, which reduces costs. In one embodiment, the detector includes fixed delay lines. In another embodiment, the detector includes adjustable delay lines to accommodate a wider range of oscillating signal frequencies. In another embodiment, first and second oscillating signals monitor each other, which is especially useful where two oscillating signals are provided to the integrated circuit 22.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An integrated circuit, comprising:
   circuit elements configured to be clocked via an oscillating signal; and
   a detector configured to detect a state of the oscillating signal and provide a detection signal indicative of the state of the oscillating signal, wherein the detector comprises a first delay line configured to provide a first delayed signal to logic that provides the detection signal and a second delay line configured to provide a second delayed signal to the logic, wherein the first delayed signal and the second delayed signal oscillate at the same frequency as the oscillating signal and the logic is configured to receive at least one high level signal and at least one low level signal and indicate the oscillating signal is oscillating.

2. The integrated circuit of claim 1, wherein the oscillating signal is provided to the logic and signal levels in the oscillating signal overlap similar signal levels in the first delayed signal and similar signal levels in the second delayed signal.

3. An integrated circuit, comprising:
   circuit elements configured to be clocked via an oscillating signal; and
   a detector configured to detect a state of the oscillating signal and provide a detection signal indicative of the state of the oscillating signal, wherein the detector comprises a first delay line configured to provide a first delayed signal to logic that provides the detection signal and a second delay line configured to provide a second delayed signal to the logic, wherein the first delayed signal and the second delayed signal oscillate at the same frequency as the oscillating signal and the logic is configured to receive similar signal levels and indicate the oscillating signal is stopped.

4. The integrated circuit of claim 1, wherein the first delay line is a fixed delay line.

5. The integrated circuit of claim 1, wherein the first delay line is a variable delay line.

6. The integrated circuit of claim 1, further comprising an adjustment circuit configured to indicate that the first delay line is set to a first delay value to detect the stale of the oscillating signal.

7. The integrated circuit of claim 1, wherein the first and second delay lines are variable delay lines.

8. The integrated circuit of claim 7, further comprising an adjustment circuit configured to indicate the first and second delay lines are set to first and second delay values to detect the state of the oscillating signal.

9. The integrated circuit of claim 1, further comprising a distribution circuit configured to distribute the detection signal to disable pulse width modulator outputs.

10. The integrated circuit of claim 1, further comprising a distribution circuit configured to distribute the detection signal indicating the oscillating signal is stopped by providing an unsynchronized reset signal to circuit elements in the integrated circuits.

11. The integrated circuit of claim 1, further comprising a distribution circuit configured to distribute the detection signal indicating the oscillating signal is stopped by providing a reset signal to synchronized circuit elements in the integrated circuit.

12. The integrated circuit of claim 1, further comprising a distribution circuit configured to distribute the detection signal indicating the oscillating signal is stopped by providing a reset signal to an input/output circuit.

13. An integrated circuit, comprising:
   a circuit element configured to be clocked by a first oscillating signal; and
   a first detector configured to detect a state of a second oscillating signal and provide a first detection signal indicating the state of the second oscillating signal, wherein the first detector is configured to sample the second oscillating signal at a sampling rate derived from the first oscillating signal and comprises a first circuit configured to receive and sample the second oscillating signal via the first oscillating signal to obtain a first result and to provide the first result to detection logic and a second circuit configured to receive and sample the first result via the first oscillating signal to obtain a second result and to provide the second result to the detection logic.

14. An integrated circuit, comprising:
a circuit element configured to be clocked by a first oscillating signal; and
a first detector configured to detect a state of a second oscillating signal and provide a first detection signal indicating the state of the second oscillating signal, wherein the first detector is configured to sample the second oscillating signal at a sampling rate derived from the first oscillating signal; and
a second detector configured to detect a state of a third oscillating signal and provide a second detection signal indicating the state of the third oscillating signal, wherein the first oscillating signal is divided to obtain the third oscillating signal and the second detector is configured to sample the third oscillating signal at a sampling rate derived from the second oscillating signal.

15. The integrated circuit of claim 13, wherein the detection logic is configured to receive similar signals and indicate the second oscillating signal is stopped.

16. A method for detecting a state of an oscillating signal, comprising:
providing the oscillating signal to detection logic;
providing the oscillating signal to a first delay line;
obtaining a first delayed signal from the first delay line;
providing the first delayed signal to the detection logic;
providing the first delayed signal to a second delay line;
obtaining a second delayed signal from the second delay line;
providing the second delayed signal to the detection logic; and
receiving a high signal level and a low signal level at the detection logic and indicating the oscillating signal is oscillating.

17. The method of claim 16, wherein the oscillating signal includes signal levels that overlap similar signal levels in the first delayed signal and similar signal levels in the second delayed signal.

18. The method of claim 16, further comprising:
receiving identical signal levels at the detection logic and indicating the oscillating signal is stopped.

19. The method of claim 16, further comprising:
adjusting a delay value of the first delay line; and
indicating the delay value detects the state of the oscillating signal.

* * * * *

UNITED STATES PATENT AND TRADEMARK OFFICE
CERTIFICATE OF CORRECTION

PATENT NO. : 7,155,628 B2
APPLICATION NO. : 10/411427
DATED : December 26, 2006
INVENTOR(S) : Douglas Gene Keithley et al.

It is certified that error appears in the above-identified patent and that said Letters Patent is hereby corrected as shown below:

Column 22, Line 35, Claim 6, delete "stale" and insert -- state --.

Signed and Sealed this

Ninth Day of November, 2010

David J. Kappos
*Director of the United States Patent and Trademark Office*